May 19, 1936.  H. D. HUME ET AL  2,041,182
HARVESTER
Filed June 24, 1935   2 Sheets-Sheet 1
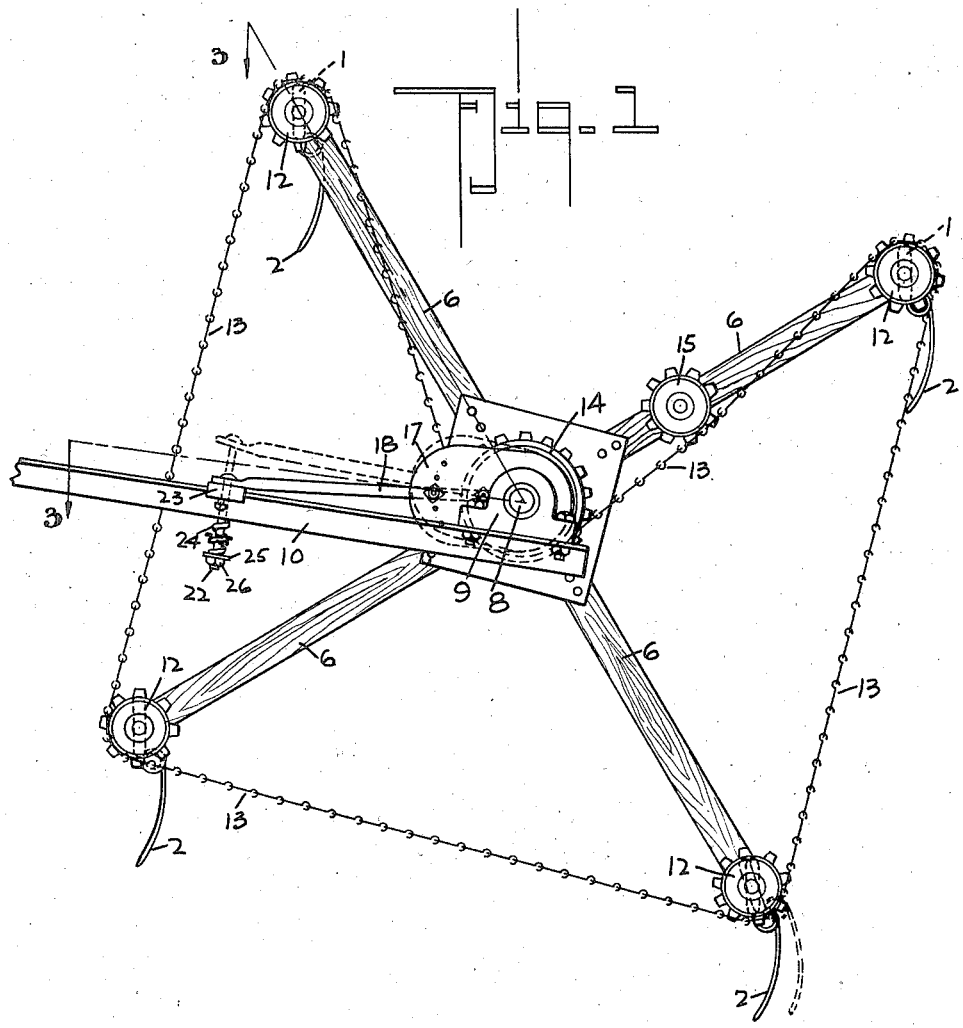
Horace D. Hume
James E. Love
Inventors
By Herbert E. Smith
Attorney

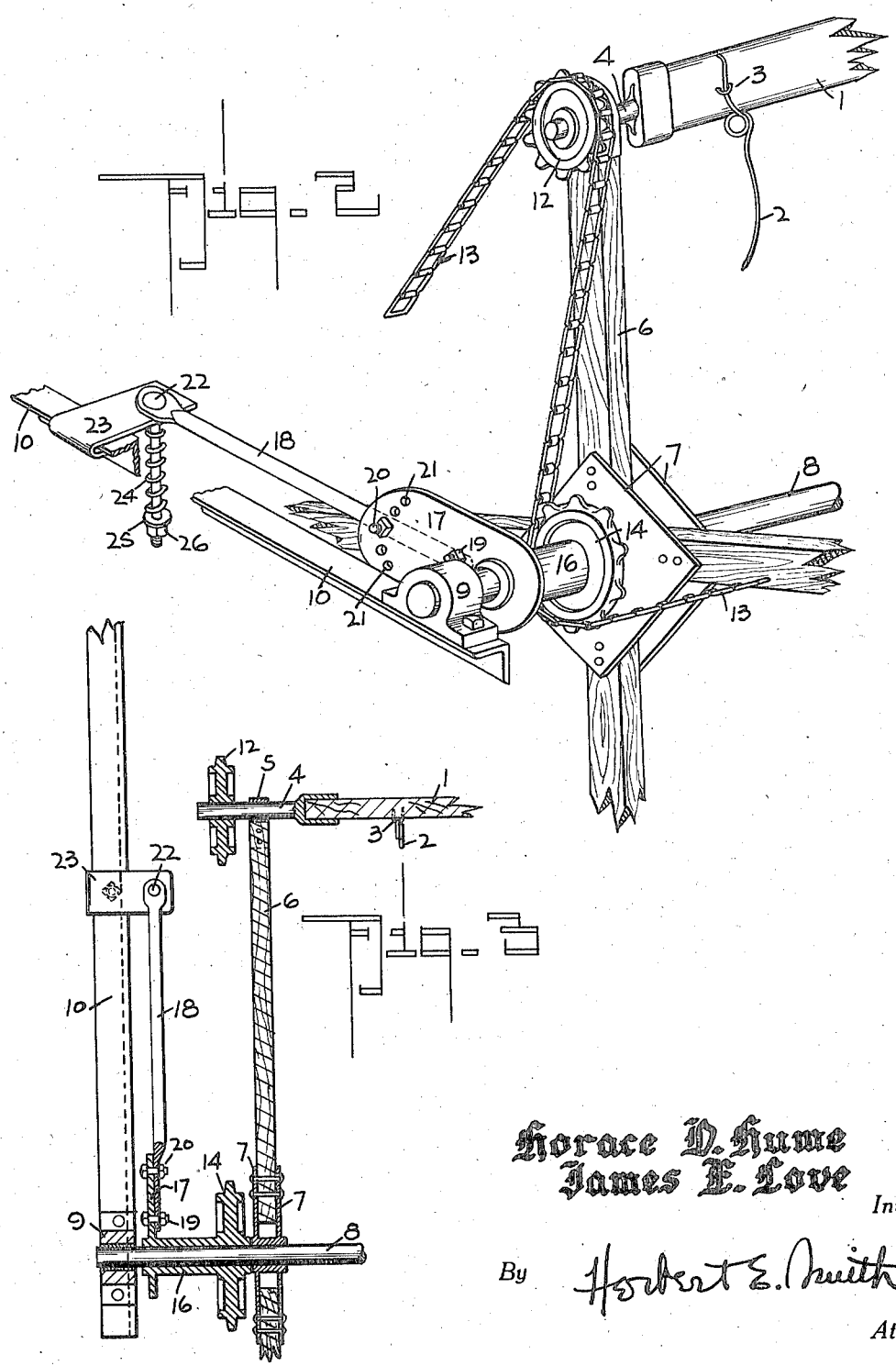

Patented May 19, 1936

2,041,182

UNITED STATES PATENT OFFICE 2,041,182

HARVESTER

Horace D. Hume and James E. Love, Garfield, Wash., assignors to Hume-Love Company, Garfield, Wash., a corporation of Washington Application June 24, 1935, Serial No. 28,114

3 Claims. (Cl. 56—226)

Our present invention relates to improvements in harvesters of the rotary reel type, wherein the reel-bats or tine-bars have a supplemental movement in addition to the rotation of the reel. Our invention is particularly adapted for use with harvesters which gather vine-crops, such as peas and soy-beans, and others that lie close to the ground and must be picked up by the gatherer or reel and passed to the separating mechanism of the harvester.

On our harvester we employ resilient tines that are rigidly mounted on the reel-bats or tine-bars of the reel and by the supplemental movement of the reel the tine-bars and tines are maintained in position so that the tines are at all times substantially perpendicular to the ground-surface over which the reel advances. When one or more of the resilient tines encounters an unyielding obstacle, or the tine becomes tangled with weeds or vines that resist to the point of breakage, the resulting ruin to the tine or tines causes inefficiency in the operation of the harvester and loss of time and labor for repairs. On our harvester we utilize, in addition to the resiliency of the tines, yielding means to compensate for excessive resistance to the action of the tines in gathering the crop, whereby the reel and tines may continue to operate, without breakage, notwithstanding the obstruction or obstructions.

In carrying out our invention we employ for the supplemental movement of the reel, an endless sprocket gearing that is driven by the rotary movement of the reel, to move the tine-bars or reel-bats and the tines mounted thereon and this sprocket gearing or operating means is provided with shock-absorbing mechanism, or compensating means, to take care of inequalities between the rotary reel and the supplemental movement of the reel-bats or tine-bars on which the tines are mounted, as will be described.

The invention consists in certain novel combinations and arrangements of parts for the above purpose as will hereinafter be more fully pointed out and claimed. In the accompanying drawings we have illustrated one complete example of the physical embodiment of our invention, wherein the parts are combined and arranged according to one mode we have thus far devised for the practical application of the principles of our invention, but it will be understood that changes and alterations may be made in the exemplifying structure, within the scope of our claims without departing from the principles of our invention.

Figure 1 is a view in elevation at one end of a reel that is equipped with the mechanism of our invention.

Figure 2 is an enlarged, perspective view of an end portion of the reel with our equalizing device applied.

Figure 3 is a detail perspective view, as at line 3—3 of Figure 1.

The rotary reel is fashioned of tine-bars or reel-bats 1, and the resilient tines 2 are mounted thereon with rigid attachment, as at 3, and at each end of the tine-bar a journal or short shaft 4 is provided and journaled in a bearing, as 5 in the outer end of a spoke 6 of the reel. At their inner converging ends the spokes are fastened together by means of hub plates 7 and suitable bolts, and the reel as a whole is rigidly mounted on a driven reel shaft 8, journaled in end bearings 9 that are mounted on the reel-supporting frame 10 of the harvester.

On the journal ends 4 of the tine-bars are mounted a set of operating sprocket wheels 12, and the endless chain 13, which passes around the four sprocket wheels, provides the supplemental movement of the tine-bars and tines, to maintain the tines in substantially perpendicular position as they revolve or rotate with the reel in the direction of the arrows in Figure 1. The operating chain 13 also passes around the central actuating sprocket wheel 14 loosely mounted on the reel shaft, and around an idle or guide sprocket 15 mounted on one of the spokes, all of the sprocket wheels being located in the same vertical plane to facilitate smooth operation of the chain-gearing.

As best seen in the sectional view of Figure 3 the actuating sprocket, or central sprocket wheel 14 is rigid with or integral with a hub-sleeve 16 loosely journaled on the reel shaft 8, and this hub-sleeve or hub is fashioned with a laterally extending arm or plate 17, to which an outwardly extending arm 18 is bolted at 19 and 20. The bolt 20 may be inserted through a selected one of the series of bolt holes 21 in the process of adjusting the tine-bars and tines, which is accomplished by turning the hub and sprocket 14 to bring all of the tines to perpendicular position of Figure 1, and after proper adjustment has been made, as the reel rotates, the relative positions of the tine-bars and tines are continuously maintained with respect to the ground surface.

As best seen in Figure 2, the outer free end of the arm 18 is provided with an angular bolt 22 that is rigidly secured thereto, and the bolt passes freely through a hole in the flat plate or holder 23 that is rigidly attached to the frame bar 10.

A spring 24 is coiled about the bolt and interposed between the under face of the holder-plate 23 and a washer 25 on the lower end of the bolt, and a nut 26 is threaded on the threaded end of the bolt. By turning the nut the tension of the spring may be varied, and precise adjustment may thereby be made as to the arm 18, the actuating sprocket 14, and the sprocket-gearing, to bring the tines into effective operating position for gathering the crop of vines.

As indicated by dotted lines in Figure 1, should the tines encounter an unyielding obstruction or obstacle, and the tines thereby be bent or flexed sufficiently to permit passing of the tine over the obstacle, the resistance is taken care of by the resiliency of the tine itself. If, however, the resistance goes beyond the resiliency of the tine, the strain is transferred to the tine-bar and a "back-pressure" is imparted to all of the tine bars and to the sprocket gearing, and thence through the arm 18 to the spring 24. The arm 18 is caused to swing upwardly in Figure 2 against the tension of spring 24, and the tine bars, particularly the lowermost bar, are swung on their journals 4 in the bearings 5 to release the tine or tines from the obstruction, and permit free movement of the tines in gathering, or passing over, the obstruction.

After the tines are freed from the obstruction, the spring 24 automatically returns all of the tine bars and their tines to perpendicular position.

Having thus fully described our invention, what we claim as new and desire to secure by Letters Patent is:—

1. The combination in a harvester with a rotary reel comprising tine-bars having journal bearings in the reel, of operating means including operating sprocket-wheels on the tine-bars, a sprocket chain, and an actuating sprocket-wheel, and resilient means operatively connected with the actuating wheel for absorbing back-pressure from the tine-bars transmitted through the operating means.

2. The combination in a harvester with a rotary reel of the supplemental movement type, of a central actuating-member, a spring-actuated arm rigidly connected with said member, and means for limiting movement of said arm.

3. In an equalizing device for use with rotary reels of the supplemental movement type, the combination with an actuating member having a hub, of a hub-plate and an adjustable arm fastened to said plate, a bolt rigid with the free end of the arm and a guide-holder for said bolt, a tension-adjusting nut on the bolt, and a tension spring coiled about the bolt and interposed between said nut and said guide-holder.

HORACE D. HUME.
JAMES E. LOVE.